United States Patent [19]

Lionelle et al.

[11] 4,297,291

[45] Oct. 27, 1981

[54] METHOD OF PREPARING THE METHYL ESTER OF α-ELEOSTEARIC ACID

[75] Inventors: Joseph E. Lionelle; Jeffrey A. Staffa, both of Salida, Colo.

[73] Assignee: Bio Systems Research, Inc., Salida, Colo.

[21] Appl. No.: 164,567

[22] Filed: Jun. 30, 1980

[51] Int. Cl.$^3$ .......................... C09F 5/02; C11C 3/02
[52] U.S. Cl. .......................... 260/410.9 R; 260/412.3
[58] Field of Search ................. 260/410.9 R, 410.9 D, 260/410.9 E, 410.9 M, 412.3, 412.4

[56] References Cited

U.S. PATENT DOCUMENTS 1,701,703  2/1927  Starrels .................. 260/410.9 D
3,226,406  12/1965  Miwa .................... 260/410 R

*Primary Examiner*—John F. Niebling
*Attorney, Agent, or Firm*—Larson and Taylor

[57] ABSTRACT

A method of preparing the methyl ester of α-eleostearic acid comprises the following steps:
  providing a reaction mixture comprising tung oil, methanol, water and a saponification agent;
  maintaining the temperature of said reaction mixture at a temperature of not more than about 60° C. for a time sufficient to effect saponification of said tung oil;
  acidifying the saponification reaction mixture while cooling to prevent excess temperature rise to form an aqueous phase and a non-aqueous phase comprising α-eleostearic acid;
  separating said aqueous and non aqueous phases;
  admixing said separated non-aqueous phase and methanol to form an esterification reactor mixture;
  heating said esterification reaction mixture in the presence of an acidic esterification catalyst to form an aqueous phase and a non-aqueous phase comprising the methyl ester of α-eleostearic acid; and
  separating said aqueous and non aqueous phases of said esterification reaction mixture to provide a non-aqueous product phase comprising the methyl ester of α-eleostearic acid.

13 Claims, No Drawings

METHOD OF PREPARING THE METHYL ESTER OF α-ELEOSTEARIC ACID

BACKGROUND OF THE INVENTION

The methyl ester of α-eleostearic acid (methyl Z, E, E-9, 11, 13-octadecatrieneoate) has been identified as an effective anti feedant for deterring boll weevils from destroying growing cotton. While various methods have been suggested for producing the acid and its ester, these methods are generally of the laboratory variety and expensive to conduct in large scale. In one method for the production of α-eleostearic acid, which is reported in J. Chem. Soc. (1957) pp. 1632-1646 at 1641, tung oil is saponified and then acidified. The acidified material is washed twice with hot distilled water. After one hour at 0° C., the solid is filtered off and recrystallized four times with ethanol and twice from pentane. The yield of acid is only about 36% based on the weight of the tung oil. In another method, which is described in Jacobson, U.S. patent application Ser. No. 140,911 filed Apr. 16, 1980, tung oil is mixed with ethanol and potassium hydroxide and refluxed for four hours under nitrogen atmosphere. After cooling in an ice bath, a 10% aqueous sulfuric acid solution is added in an amount sufficient to render the system acidic, with the α-eleostearic acid being present in an oily layer on top of an aqueous layer. Ether, in an amount approximately equal to the volume of the oily layer, is added to the system and the vessel is shaken to dissolve the oily acid in the ether. The ether layer which settles out is then separated and dried with sodium sulfate. The ether is evaporated and the acid residue is taken up in acetone and crystallized out by cooling to about 20° C. The crystals are α-eleostearic acid, melting point 48° C., and the yield from 134 grams of tung oil is 75 grams of acid. The acid is then esterified with methanol to produce the methyl ester.

While both of the foregoing processes produce good quality product in substantial quantity, it is envisaged that the successful application of the material as a boll weevil anti-feedant for cotton crops will require the much more efficient production of the product than is possible with either of the reported processes.

It is an object of the present invention to provide a new method of producing the methyl ester of α-eleostearic acid. It is a further object to provide such a process which is simple and inexpensive to operate in large scale. It is a further object to provide such a process in which the product is obtained in high yield.

BRIEF SUMMARY OF THE INVENTION

The foregoing and other objects which will be apparent to those of ordinary skill in the art are achieved in accordance with the present invention by producing the methyl ester of α-eleostearic acid in a process which comprises:

providing a reaction mixture comprising tung oil, methanol, water and a saponification agent;

maintaining the temperature of said reaction mixture at a temperature of not more than about 60° C. for a time sufficient to effect saponification of said tung oil;

acidifying the saponification reaction mixture while cooling to prevent excess temperature rise, to form an aqueous phase and a non-aqueous phase comprising α-eleostearic acid;

separating said aqueous and non aqueous phases;

admixing said separated non-aqueous phase and methanol to form an esterification reactor mixture;

heating said esterification reaction mixture in the presence of an acidic esterification catalyst to form an aqueous phase and a non-aqueous phase comprising the methyl ester of α-eleostearic acid; and separating said aqueous and non-aqueous phases of said esterification reaction mixture to provide a non-aqueous product phase comprising the methyl ester of α-eleostearic acid.

DETAILED DESCRIPTION OF PREFERRED EMBODIMENTS

In accordance with the present invention, tung oil is saponified in a reaction mixture comprising tung oil, methanol, water, and a saponification agent. The saponification agent is preferably potassium hydroxide and is used in excess of the stoichiometric amount, preferably 1.2 to 4 times stoichiometric. The stoichiometric amount of potassium hydroxide is conveniently determined by the saponification number which, for tung oil, is 190-197. The methanol for saponification is preferably used in a small amount, the volume ratio of methanol to tung oil being preferably not in excess of 4:1, more preferably not in excess of 2:1. A minimum volume ratio of about 0.5:1 is requitred as a practical matter. The amount of water in the saponification reaction mixture is also preferably kept to a minimum, preferably not in excess of 75% of the amount of saponification agent. The saponification agent is preferably added in the form of a 25-75% by weight aqueous solution of potassium hydroxide: thus, the water in the reaction mixture may be supplied in this manner.

Saponification is carried out by maintaining the temperature of the saponification reaction mixture at a suitable temperature for a time sufficient to effect saponification of the tung oil. The temperature is preferably maintained below 60° C. to prevent loss of methanol. Temperature is preferably maintained lower, generally below 35° C., and even more preferably below 20° C., to minimize the formation of the beta form of the eleostearic acid. The reaction mixture may be cooled as required to maintain its temperature. If desired, saponification may be carried out under inert atmosphere, such as a nitrogen atmosphere.

By utilizing a small amount of methanol and a concentrated solution of saponification agent, the process is effected very rapidly which facilitates large-scale operation to which the invention is particularly well suited.

After saponification is carried out, the reaction mixture is acidified to form an aqueous phase and a lighter non-aqueous phase comprising α-eleostearic acid. In addition, a salt of the saponification agent usually precipitates and settles to the bottom of the aqueous phase. Where the saponification agent comprises potassium hydroxide, the precipitate comprises potassium sulfate which may be recovered and sold, for example, as a fertilizer product. Acidification is effected with cooling to prevent excess temperature rise since higher temperatures give rise to the formation of β-eleostearic acid, the methyl ester of which is not particularly effective as a boll weevil feeding deterrent. The temperature is preferably maintained below 35° C. preferably below 20° C., and may be maintained at less than 10° C. or 5° C. or even lower to the extent that it becomes desirable to reduce the formation of the beta form of the acid. In this regard it will be appreciated that a reduction in the amount of the beta acid in the product is obtained at the expense of cooling costs.

The aqueous phase, and the non-aqueous phase, which is largely made up of α-eleostearic acid, are then separated for preparation of the methyl ester. Separation can be effected in any convenient way such as by decantation. It is preferred, however, in commercial operation to first remove any precipitated saponification agent by filtration and to then separate the aqueous and non aqueous phases in a separatory funnel or the like.

Esterification is then carried out by reacting the separated non-aqueous phase with methanol in the presence of an esterification catalyst such as sulfuric acid. The amount of methanol is generally in excess of stoichiometric and preferably about 1 to 4 volumes of methanol per volume of the non-aqueous phase. The esterification reaction is preferably carried out by boiling with reflux.

By carrying out the method as described, the product is produced in high yield and yield in a manner which is commercially feasible. Commercial scale equipment for carrying out the process is readily available. Stainless steel materials are preferred where acid resistance is needed and the choice of stainless steel dictates the use of an acid, such as sulfuric, to which stainless steel is resistant, for acidification.

The following example is illustrative of the excellent yield of a high quality product in accordance with the invention.

EXAMPLE

Into a 600 milliliter flask are placed 100 milliliters of tung oil and 100 milliliters of methanol. The reaction mixture is stirred at room temperature. Then a solution of 40 grams (1.4 moles) of potassium hydroxide in 40 milliliters of water is added to the solution of tung oil in methanol. With cooling, 50 milliliters of 50% $H_2SO_4$ solution is added to the reaction vessel. The resulting salt ($K_2SO_4$) is filtered. The filtrate is placed into a separatory funnel to remove the water. The remaining oil (α-eleostearic acid) is placed into a 500 milliliter flask with 200 milliliters of methanol. Thirty (30) drops of concentrated $H_2SO_4$ is added, and the solution is refluxed for 3 hours, poured into a separatory funnel, and cooled. The water and methanol phase is decanted to yield 84 milliliters of a yellow oil, 95% methyl ester of α-eleostearic acid.

What is claimed is:

1. A method of preparing the methyl ester of α-eleostearic acid which comprises:
   providing a reaction mixture comprising tung oil, methanol, water and a saponification agent;
   maintaining the temperature of said reaction mixture at a temperature of not more than about 35° C. for a time sufficient to effect saponification of said tung oil;
   acidifying the saponification reaction mixture while cooling to maintain temperature of the reaction mixture at not more than 35° C. to form an aqueous phase and a non-aqueous phase comprising α-eleostearic acid;
   separating said aqueous and non-aqueous phases;
   admixing said separated non-aqueous phase and methanol to form an esterification reaction mixture;
   heating said esterification reaction mixture in the presence of an acidic esterification catalyst to form an aqueous phase and a non-aqueous phase comprising the methyl ester of α-eleostearic acid; and
   separating said aqueous and non-aqueous phases of said esterification reaction mixture to provide a non-aqueous product phase comprising the methyl ester of α-eleostearic acid.

2. A method according to claim 1 wherein the volume ratio of methanol to tung oil in said saponification reaction mixture is from 0.5:1 to 4:1.

3. A method according to claim 2 wherein said volume ratio is from 0.5:1 to 2:1.

4. A method according to claim 2 wherein said saponification agent comprises potassium hydroxide.

5. A method according to claim 3 wherein said potassium hydroxide is present in an amount in excess of stoichiometric.

6. A method according to claim 5 wherein the amount of water present in said saponification reaction mixture is not more than 75% by weight based on the weight of said potassium hydroxide.

7. A process according to claim 1 wherein said acidification of said saponification reaction mixture is effected while maintaining the temperature of the reaction mixture below 20° C.

8. A method according to claim 1 wherein said acidification of said saponification reaction mixture causes the precipitation of a salt of said saponification agent, and comprising the further step of removing the precipitated salt from the reaction mixture prior to separating said aqueous and non-aqueous phases.

9. A method according to claim 7 wherein the volume ratio of methanol to said non-aqueous phase in said esterification reaction mixture is from 1:1 to 4:1.

10. A method according to claim 1 wherein said esterification reaction mixture is heated by boiling with reflux.

11. A method according to claim 1 wherein the temperature of the reaction mixture is maintained below 20° C. during saponification.

12. A method according to claim 1 wherein said water is provided in said saponification mixture in an amount not in excess of 75% of the amount of saponification agent.

13. A method according to claim 1 wherein saponification and acidification are effected in the same reaction vessel.

* * * * *